June 11, 1929.

G. EVENO

Re. 17,322

LUBRICATING BEARING FOR JOURNAL BOXES

Original Filed May 13, 1920 2 Sheets-Sheet 1

WITNESSES:-

Chas. L. Griesbauer

Emory D. Groff

Inventor

Georges Eveno,

By

S. P. Wolhandler

Attorney

June 11, 1929. G. EVENO Re. 17,322

LUBRICATING BEARING FOR JOURNAL BOXES

Original Filed May 13. 1920 2 Sheets-Sheet 2

WITNESSES:
Chas. L. Grieobauer
Romory L. Groff

Inventor
Georges Eveno,
By D. P. Wolhaupter
Attorney

Reissued June 11, 1929. Re. 17,322

UNITED STATES PATENT OFFICE.

GEORGES EVENO, OF PARIS, FRANCE, ASSIGNOR TO ISOTHERMOS CORPORATION OF AMERICA, OF NEW YORK, N. Y., A CORPORATION OF DELAWARE.

LUBRICATING BEARING FOR JOURNAL BOXES.

Original No. 1,701,707, dated February 12, 1929, Serial No. 381,050, filed May 13, 1920, and in France May 16, 1919. Application for reissue filed March 26, 1929. Serial No. 350,120.

My invention relates to journal boxes for railway cars and the like, and has as its chief object the provision of means for distributing and retaining the lubricant within the box. With this in view it is my object to provide a lubricating device capable of supplying a journal with a regular and continuous amount of lubricant in suitable quantities at all speeds; and also to prevent, or reduce to a minimum, loss of lubricant from the box. It is further my object to utilize both the force of gravity and centrifugal force to accomplish distribution of the lubricant.

My invention then consists in the construction, combination, and arrangement of parts herein described and claimed, and illustrated in the accompanying drawings which show by way of example in vertical section various practical forms of the invention applied to a railway vehicle axle box.

In these drawings, in which similar reference characters designate corresponding parts in all views, Figure 1 shows a form in which the collecting member overhangs the bearing;

Figure 5:
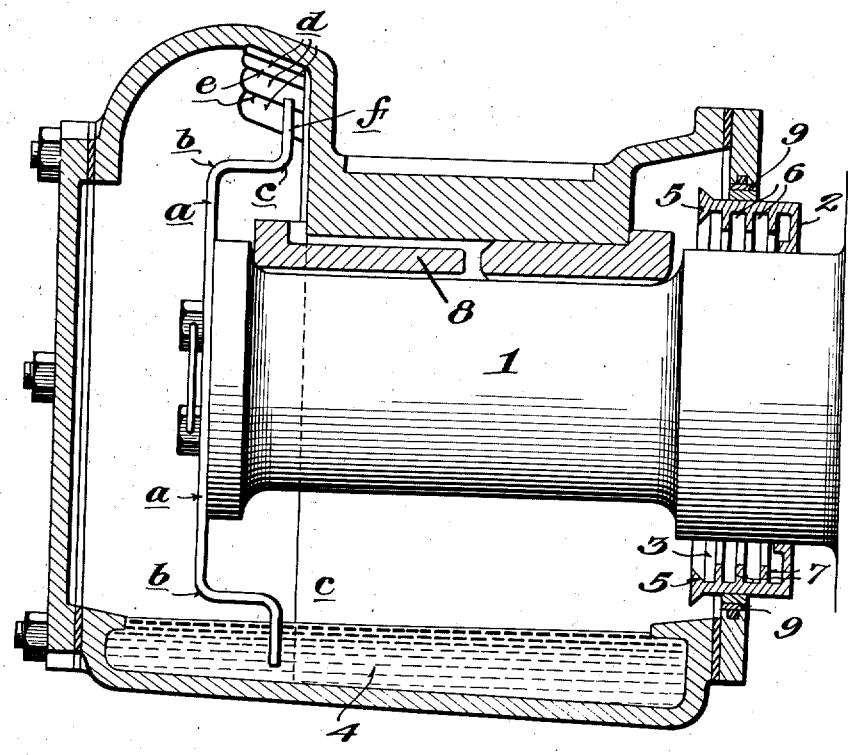

Referring to these drawings and particularly to Figure 5, the journal 1 supports the box through the brass 8 which rests thereon, the brass 8 preferably being provided with grooves in the usual manner for the distribution of the lubricant supplied to the brass.

On the end of the journal I secure, by suitable means such as the bolts shown, a pallet *a*, preferably formed of a strip of metal extending to both sides, and bent at *b* and *c* so as to extend over the end of the brass 8, the portion beyond the bend *c* being of sufficient length to dip into the oil reservoir 4 at the bottom of the box as the journal revolves.

The width of the pallet to be used depends on the size of the journal and the viscosity of the lubricant, being made sufficient to pick up enough lubricant to supply the bearing with its needs.

The upper part of the box above the path of the pallet *a* is inclined and provided with a series of pockets *d*, the dividing edges *e* of which lead the lubricant thrown thereon by centrifugal force from the pallets to the wall *f* of the box, which the lubricant runs down onto the brass 8 whence it is distributed by the said grooves in the usual manner.

In view of the bends in the pallet, bringing the ends over the brass, when the speed is not sufficient to cause the oil to be thrown off against the pockets *d* by centrifugal force, it drips directly on the brass from the bend *c*, so that either at high speed under centrifugal force or at low speed under the force of gravity oil is supplied to the brass.

Lubricant being provided in quantity to the journal it is important to provide efficient means for preventing loss of lubricant along the shaft. While discs have been used for this purpose, such have not proven entirely satisfactory, and I have devised a collecting member 2 fixed to the shaft and having a cavity 3 facing toward the journal of such dimensions that the capacity thereof corresponds to the quantity of oil or grease received by the part lubricated, which oil or grease has a tendency to escape by the opening of the bearing during the rotation of the axle between two stops of the vehicle.

Lubricant passing along the journal 1 from under the brass 8 has a tendency to be thrown outward by centrifugal force, and also to flow along the shaft. The collecting member 2 may be disposed as shown in the Figures 1–4 to overhang the end of the brass and collect the oil thrown off by centrifugal force, which is retained in the cavity 3 while the shaft rotates rapidly, but as the vehicle comes to a stop, the collected lubricant flows gently from the bottom edge of the collecting member 2 into the oil reservoir 4. Experience has demonstrated that the lubricant will be maintained by centrifugal action in the cavity 3 until a relatively slow speed insufficient to cause projection is attained.

Figure 1:
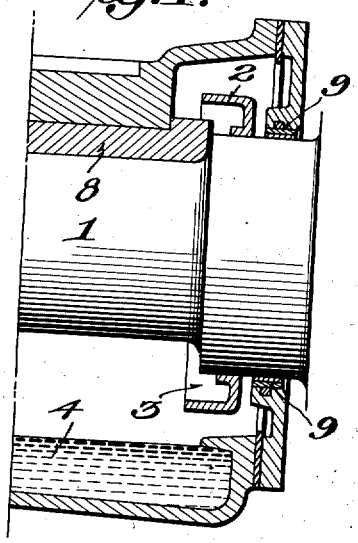
Figure 2:
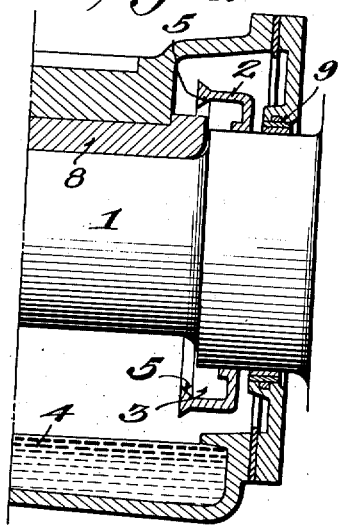
Figure 2 shows an arrangement similar to Fig. 1, in which the collecting member is provided with a coned edge.
Figure 3:
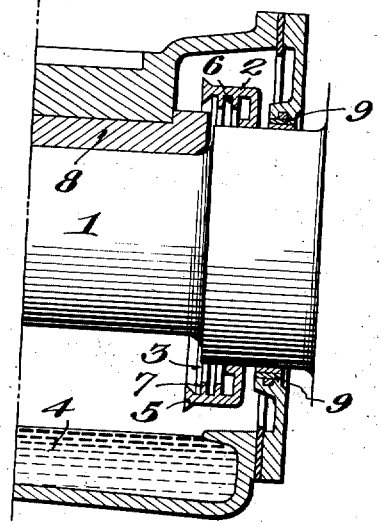
Figure 3 shows a similar arrangement in which the collecting member is provided with interior partitions.

To facilitate flowing of the lubricant when the vehicle stops and in order to prevent the small quantity which may be found on the edge of the member 2 at the moment of starting into movement from flowing over the external surface of the disc and thus escaping to the exterior of the axle box, the external and internal edges of the member 2 may be provided with coned portions 5 (Fig. 2).

To avoid premature flowing of the lubricant due to transverse shocks which may break the adherence and the cohesion of the liquid, separation chambers 6 (Figs. 3, 4 and 5) may be provided formed by the interposition of rings or partitions 7 integral with the internal surface of the member 2. The chambers 6 act not only because the contact surface is very great but also because the weight of the liquid in suspension is diminished. On the other hand, the resistance to shocks combined with the centrifugal action is found to augment proportionately to the surface.

Figure 4:
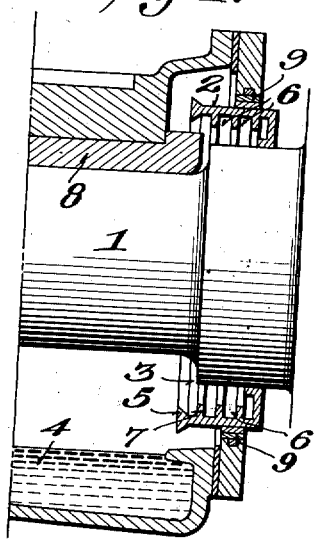
Figure 4 shows an arrangement in which the collecting member serves also as a bearing for the dust cap; and, Figure 5 shows a complete journal box including means for distributing the lubricant, and showing an arrangement in which the collecting member does not overhang the bearing.

Figs. 4 and 5 show the member 2 in two different positions relatively to the brass 8, the first overhanging the brass and the second removed from it, but in both of which the member 2 serves as a bearing for the dust cap 9 while it is preferable, generally speaking, to cause the member 2 to overhang the brass 8. This second arrangement may be used advantageously where the space is limited for the adaptation of the lubricating bearing to the axle.

I claim:—

1. In a journal box, means for retaining the lubricant comprising a collecting member secured to the shaft and having a cavity facing toward the journal, and inward and outward conical flanges formed at the edge of said member.

2. In a journal box, means for retaining the lubricant comprising a collecting member secured to the shaft and having a cavity facing toward the journal, said cavity being divided by internal annular partitions.

3. In a journal box, means for retaining the lubricant comprising a collecting member secured to the shaft and having a cavity facing toward the journal, said member forming a bearing for the dust guard.

4. In a journal box, means for retaining the lubricant comprising a collecting member secured to the shaft and having a cavity facing toward the journal, and an inwardly extending conical flange formed at the edge of said member.

5. In a journal box, means for retaining the lubricant comprising a collecting member secured to the shaft and having a cavity facing toward the journal, and inwardly and outwardly extending flanges formed at the edge of said member.

6. In a journal box having a lubricant reservoir, a bearing having passages leading from the end thereof to distribute lubricant to the journal, a pallet secured to said journal having a portion arranged to dip into the lubricant reservoir and to pass over the end of said bearing, and means on the inner top surface and connecting side wall of the casting forming the box for directing lubricant to said passages in the bearing.

7. In a journal box having a lubricant reservoir, a bearing having passages leading from the end thereof to distribute lubricant to the journal, a pallet secured to said journal having a portion arranged to dip into the lubricant reservoir and to pass over the end of said bearing, and means on the inner top surface and connecting side wall of the casting forming the box for directing lubricant to said passages in the bearing, said means comprising a plurality of adjacent channels in both the top surface and side wall forming continuous intervening lubricant guiding ribs.

8. In a journal box having a lubricant reservoir, a bearing having passages leading from the end thereof to distribute lubricant to the journal, a pallet secured to said journal having a portion arranged to dip in the lubricant reservoir and to pass over the end of said bearing, and means above the path of the pallet on the inner top surface and also on the connecting side wall of the casting forming the box for directing lubricant to the said passages of the bearing.

9. In an automatic lubricating journal box having a lubricant reservoir, a bearing having means for distributing lubricant to the journal, means for conducting the lubricant in a continuous circuit from the said reservoir through the said distributing means and back to the reservoir, said means comprising a pallet secured to the end of the journal and having a portion thereof arranged to dip into the reservoir and to pass over the end of said bearing, means on the inner top surface and connecting side wall of the casting forming the box to receive centrifugally thrown lubricant and direct the same to the bearing, and a lubricant collecting member on the shaft at the rear end of the bearing and having a cavity facing toward the journal.

In testimony whereof I hereunto affix my signature.

GEORGES EVENO.